Aug. 15, 1933.   J. S. EDWARDS   1,922,359
FIFTH WHEEL CONSTRUCTION
Filed Sept. 24, 1932   3 Sheets-Sheet 1

INVENTOR.
John S. Edwards.
BY
ATTORNEY.

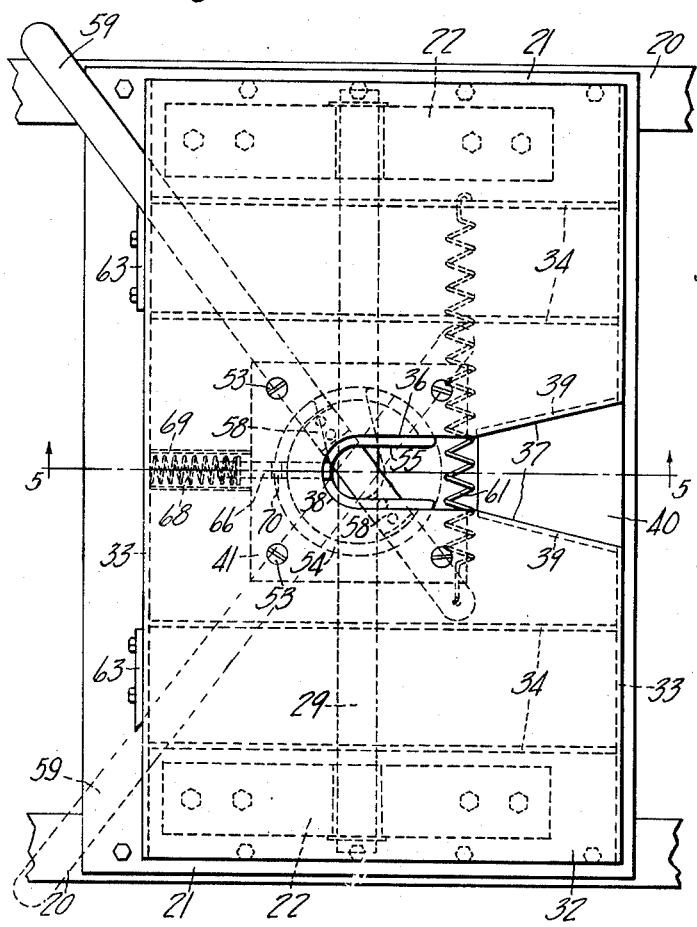
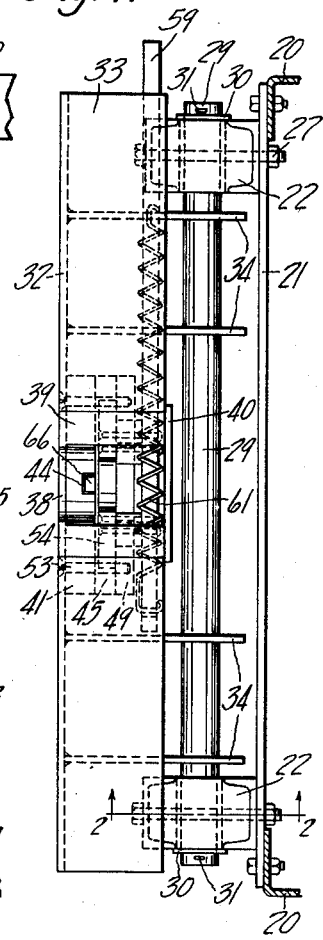
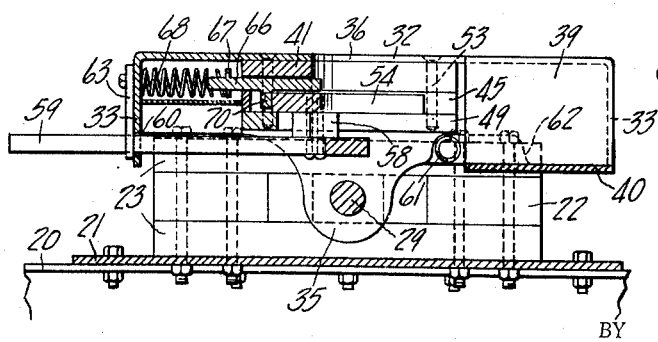

Aug. 15, 1933.   J. S. EDWARDS   1,922,359
FIFTH WHEEL CONSTRUCTION
Filed Sept. 24, 1932   3 Sheets-Sheet 3
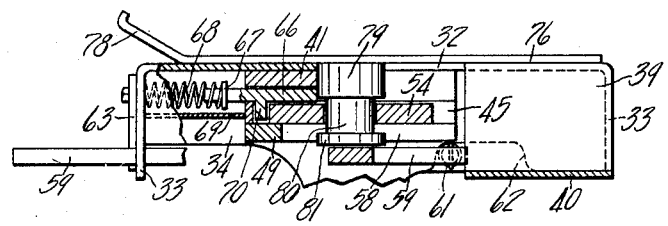
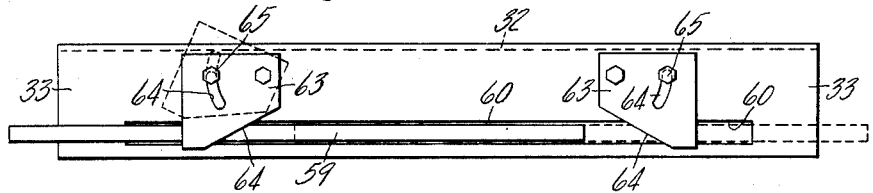
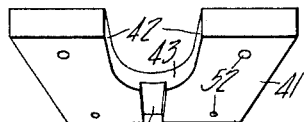
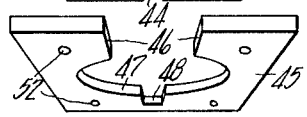
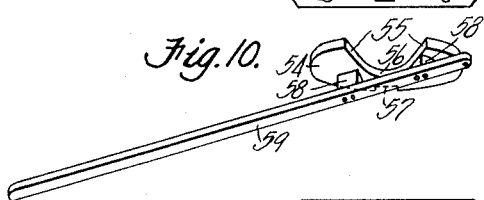
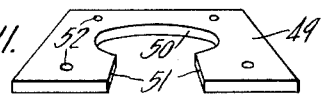
INVENTOR.
John S. Edwards.
BY
ATTORNEY.

Patented Aug. 15, 1933

1,922,359

UNITED STATES PATENT OFFICE 1,922,359

FIFTH WHEEL CONSTRUCTION

John S. Edwards, South Bend, Ind.

Application September 24, 1932
Serial No. 634,669

9 Claims. (Cl. 280—33.1)

The invention relates to fifth wheel constructions, and more particularly to fifth wheel couplings for tractors and semi-trailers, and has for its principal object to provide a device of this character which is simple in construction and operation and inexpensive to manufacture.

A further object is to provide a device of this character which automatically operates to couple the tractor and trailer when they are moved into operative juxtapositioned relation.

A further object is to provide a device of this character which is constructed principally of sheet metal whereby the cost of casting and machining parts is reduced to a minimum.

A further object is to provide a device of this character with novel means for snubbing relative movement of the tractor and trailer in starting and stopping.

A further object is to provide a device of this character having a coupling element which is normally urged to coupling position and provided with latching means to prevent its movement to open position.

A further object is to provide a device of this character having a coupling element normally urged to coupling position and means for latching said element in open position when the tractor and trailer are uncoupled whereby the device is ready for the coupling operation.

A further object is to provide a device of this character having a normally closed coupling element with means for latching said element in open position and operable upon relative movemet of the tractor and trailer into operative juxtaposition to release said coupling element.

With the above and other objects in view, the invention resides in the combination and arrangement of parts as hereinafter set forth, shown in the drawings, described and claimed, it being understood that changes in the precise embodiment of the invention may be made without departing from the spirit of the invention.

In the drawings:

Figure 3 is a top plan view of the lower section of my fifth wheel.

Figure 4 is a rear end view of the lower section of my fifth wheel.

Figure 5 is a transverse sectional view of the lower section of my fifth wheel taken on line 5—5 of Figure 3.

Figure 6 is a fragmentary side view of my fifth wheel with parts shown in section taken on line 5—5 of Figure 3, illustrating the fifth wheel in coupled position.

Figure 7 is a front end view of the lower section of my fifth wheel.

Figures 8, 9, 10 and 11 are perspective views illustrating the parts forming the coupling elements of my device and the socket therefor.

Figure 1:
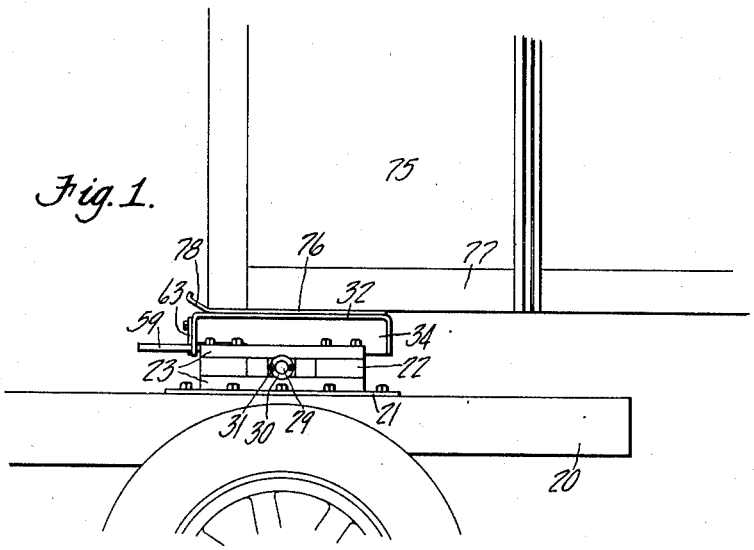
Figure 1 is a view in side elevation illustrating my fifth wheel construction coupling a tractor and trailer, parts only of the tractor and trailer being shown.

Referring to the drawings, which illustrate the preferred embodiment of the invention, the numeral 20 designates the frame of a suitable tractor, across and at the rear of which is mounted a plate 21. A pair of snubbers 22 are mounted adjacent the opposite sides of said plate and extend longitudinally of the tractor. The snubbers comprise spaced upper and lower channel irons 23 whose flanges are disposed in the direction of each other to form a frame, a configured metal block 24 centrally disposed and slidable in said frame, blocks 25 of rubber or other suitable resilient material disposed in said frame on opposite sides of and in engagement with said center block 24, and blocks 26 of wood, steel or other suitable material disposed in said frame at the opposite ends thereof and in engagement with blocks 25. The blocks 24, 25 and 26 are all configured as illustrated in Figure 4 to fit between the opposed channels 23, and a plurality of bolts 27 extend vertically through the snubber and the end blocks 26 thereof to secure the snubber to the plate 21. The center block 24 of each snubber has a horizontal hole formed centrally thereof in which is mounted a bearing 28, each bearing 28 receiving one end of a shaft 29. Collars 30 are mounted on the shaft at the outer ends thereof and are held in place by cotter pins 31.

A sheet steel bolster plate or fifth wheel element 32 having downturned ends or flanges 33 has secured to its under side a plurality of spaced vertically longitudinally extending sheet metal plates 34 having off-sets 35 through which shaft 29 extends and to which said shaft is fixedly secured, as by welding. To one side of shaft 29 the plates 34 are of the same height as the rear flange 33 to which they are secured, while at their opposite ends the plates 34 depend from plate 32 a distance substantially one-half the height of the forward flange 33, for purposes to be hereinafter set forth. Centrally of plate 32 and extending longitudinally from the rear thereof to a point substantially centrally thereof is a slot 36 which is flared at 37 at its outer end, and whose inner end 38 is rounded to form a king pin socket. Vertical plates 39 extend downwardly from plate 32 at the flared portion 37 of slot 36, and a plate 40 extends between and is secured to the lower ends of said plates 39.

Centrally below the king pin socket 38 is secured a sectional coupling member socket, the construction of the parts of which is illustrated in Figures 8, 9 and 11. The upper socket part 41 bears against the under side of bolster plate 32, and has a slot 42 formed therein which terminates in a rounded portion 43, said slot and its rounded portion registering with the slot 36 and king pin socket 38 of bolster plate 32. A groove 44 is formed in the under side of part 41 and extends centrally longitudinally thereof between the rounded portion 43 of slot 42 and the forward end of the part. The intermediate socket part 45 has a slot 46 and a concentric circular recess 47 formed therein, said slot extending from the recess to the rear end of the part and registering with the slot 36 of plate 32. A notch 48 communicating with the recess 47 and extending forwardly therefrom in spaced relation to the forward end of the part is also formed in the part 45. The bottom socket part 49 has a central recess 50 of smaller diameter than recess 47 of part 45 formed therein, and a slot 51 registering with the slot 36 of plate 32 extends between said recess 50 and the rear of said part. The parts 41, 45 and 49 each have a plurality of apertures 52 formed therein adjacent their corners for the reception of bolts 53 by which the parts are secured together and to the bolster plate 32.

Loosely mounted in the circular recess 47 of intermediate plate 45 is a coupling element 54 of disc shape. The coupling element 54 is of a thickness slightly less than the thickness of part 45 and of a diameter slightly less than the diameter of recess 47, whereby it is free to rotate in said recess. The disc coupling element is supported by the bottom socket part 49. A slot 55 of less width than the slot 36 of bolster plate 32 is formed in the disc coupling member and terminates at its inner end in a rounded portion 56 concentric of the disc, said slot 55 extending to the periphery of the disc. A notch 57 is formed in the disc coupling member diametrically opposite slot 55 for purposes to be hereinafter set forth. A pair of blocks 58 are secured to the under side of coupling disc 54 and depend therefrom through the recess 50 of lower socket member 49. The blocks 58 are aligned with the center of the disc and are disposed on opposite sides of slot 55, the center line of said blocks being arranged at an angle of approximately 50 degrees to the center line of slot 55. The blocks 58 carry a lever arm 59 which is spaced below the lower socket part 49 and whose rear end terminates in spaced relation to the disc and whose forward portion is elongated to project beyond the forward flange 33 of the bolster plate 32, said flange 33 having a slot 60 formed therein through which said lever arm extends. A coil spring 61 extends between the rear end of lever 59 and the outer plate 34 at the side of plate 32 toward which the lever 59 extends when the coupling disc is open as illustrated in Figure 3. A suitable recess 62 through which spring 61 extends is formed in the plate 34 intermediate the end of lever 59 and plate 34 to which the spring is secured. The slot 60 in the forward flange 33 extends substantially the width of said flange to permit the lever arm 59 to have a movement from side to side relative to the bolster plate, said movement approximating 100 degrees about the center of disc 54. Adjacent the opposite ends of slot 60 are pivoted locking plates 63 which have their lower inner corners bevelled at 64 and in which are formed slots 65 receiving bolts 66 to limit the pivotal movement of said plates and normally hold them in operative locking position as illustrated in Figure 7.

A plunger 66 is slidably mounted in the groove 44 of upper socket part 41 and has a flange 67 formed therein adjacent its forward end. A coil spring 68 encircles the forward end of plunger 66 and bears upon flange 67 and the inner side of forward flange 33 of bolster plate 32, said flange 33 supporting a suitable housing member 69 for said spring. Spring 68 normally urges plunger 66 rearwardly, and this movement of the plunger is limited by a downwardly extending projection 70 carried thereby and seating in notch 48 of intermediate socket plate 45, or in the notch 57 in the coupling disc 54 when said notch registers with said plunger which occurs when the locking disc is in open position. The rear end of plunger 66 projects into the king pin socket 43 of socket part 41.

A semi-trailer 75, of conventional construction and adapted to be coupled with the tractor carries a bolster plate 76 at the forward under side of its frame 77, and said plate projects forwardly of the trailer frame to provide an upwardly inclined flange 78. A suitable king pin 79 depends centrally from the plate 76 and is provided with a circumferential recess 80 spaced from plate 76 a distance substantially equal to the width of upper socket member 41, said recess being of a width greater than the width of the coupling member 54. An enlarged head 81 is formed on the end of the king pin.

Figure 2:
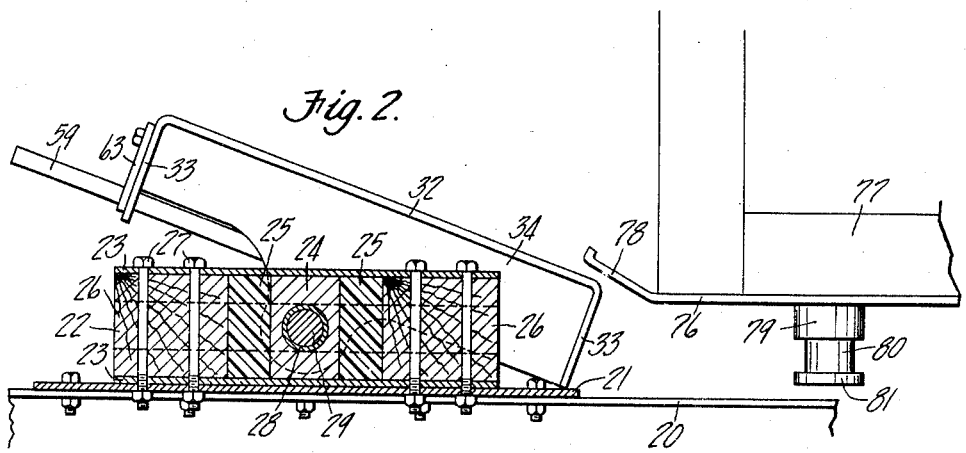
Figure 2 is a view in side elevation, and partly in section taken on line 2—2 of Figure 4, illustrating my fifth wheel about to be coupled.

The operation of the device is as follows: Assuming that the tractor and semi-trailer are separated and positioned as shown in Figures 2 and 3, the tractor is backed to the trailer in substantial alignment therewith. In the event the forward end of the trailer bolster plate is lower than the rear tilted end of the tractor bolster plate as illustrated in Figure 2, the upwardly inclined flange 78, upon engaging said bolster plate rides up the same and thus raises the trailer sufficiently to permit the tractor bolster plate to slide to operative position under the tractor bolster plate 76. In the relative movement of the bolster plates to coupling position, the king pin 79 passes through the flared opening 37 in tractor bolster plate 32 by which it is guided to the slot 36 and socket 38 and into the slots in the parts forming the socket for coupling member 54. Immediately preceding its reception in operative position in socket 38 the king pin engages the end of plunger 66 normally projecting into said socket, and thence pushes said plunger forwardly in its groove against the action of spring 68. The forward movement of the plunger shifts the projection 70 thereof from notch 57 in the coupling disc 54 into notch 48 of the intermediate socket part 45 clear of said coupling disc. The coupling disc is then free to rotate about 100 degrees in its socket to a king pin locking position illustrated in dotted lines in Figure 3 under the action of spring 61 connected to lever arm 59 carried by said coupling disc. It will be seen, of course, that the aforedescribed movement of the locking disc requires that the lever arm shall have been released from the locking plate 63 by which it is normally held when the coupling disc is held in open position, such release of the lever arm being permitted when the plunger is seated in notch 48 by forming said notch of a size slightly wider than the width of the plunger. The spring 61 swings the lever arm 59 to the opposite end of the slot 60 where it engages the opposite locking plate 63 and the inclined face thereof to swing said locking plate upwardly and permit the lever arm to pass therebehind into a locking position whereby the coupling disc is locked in coupling position by the locking of said lever arm by locking plate 63. It will be seen in Figure 6 that the width of the slot 55 of the coupling disc 54 and the diameter of the recessed portion 80 of the king pin are substantially equal, so that independent movement of the tractor and trailer when the same are operatively coupled is reduced to the smallest limits consistent with free movement of the king pin in said slot in its movement to and from locking position. It will also be seen that the lever arm 59 and spring 61 are positioned below the bottom of the king pin to permit movement of either without interference with the other.

To disconnect the tractor and trailer the lever arm 59 is manually swung from king pin locking position to the opposite end of slot 60, as illustrated in Figure 3, where it is held against the action of spring 61 by the other locking plate 63 and positions the coupling disc in open position. The tractor and trailer may then be disconnected by moving the tractor forwardly, and in so doing the weight of the trailer in sliding off the lower bolster plate rearwardly tilts said plate preparatory to recoupling. Upon uncoupling said vehicles, the withdrawal of the king pin permits the plunger 66 to be pushed into the notch 57 of the coupling disc 54 by the spring 68 whereby the coupling disc will be held in unlocked position independently of the locking plate 63 of the lever arm, which lever arm is thus permitted to be released from the locking plate preparatory to subsequent automatic coupling of the tractor and trailer as previously described.

It will be observed that the construction of the bolster plates of sheet steel minimizes the cost thereof, while at the same time being of adequate strength by virtue of the downwardly bent end flanges 33 thereof and the plates 34 which are preferably welded along their edges to the under side of plate 32 and to the flanges 33. The plates 34 also serve to form means by which the bolster plate may be secured to the shaft 29 at spaced points thereof to adequately support said bolster plate. It will also be observed that the construction of the device of sheet steel reduces to a minimum the parts necessary to be machined or cast, these being only the socket forming members, the coupling disc, and the locking plunger.

The invention having been set forth, what is claimed as new and useful is:

1. A fifth wheel construction comprising a pair of bearing members adapted for pin and slot interconnection, a coupling member shiftably carried by said slotted bearing member, a lever carried by said coupling member and projecting beyond said bearing member, means for locking said coupling member in pin receiving position and shiftable to unlocking position by said pin, a spring urging said coupling member to pin retaining position, and means carried by said bearing member for locking said lever in pin locking position.

2. A fifth wheel construction comprising a pair of bearing members adapted for pin and slot interconnection, a coupling member shiftably carried by said slotted bearing member, a lever carried by said coupling member and projecting beyond said bearing member, means for locking said coupling member in pin receiving position and shiftable to unlocking position by said pin, a spring urging said coupling member to pin retaining position, means carried by said bearing member for locking said lever in pin retaining position, said lever being shiftable against said spring to open said coupling member to pin receiving position, and means locking said lever in pin receiving position.

3. In combination, a tractor, a semi-trailer, cooperating plates carried by said tractor and trailer, one of said plates carrying a king pin and the other having a king pin receiving slot formed therein, a socket carried by said slotted plate and having a slot registering with said plate slot, a coupling member freely rotatable in said socket and having a radial slot formed therein, a spring pressed plunger carried by said socket and normally projecting into said slot, means carried by said plunger for locking said coupling member with its slot registering with said socket slot, and means urging said coupling member to a position with its slot out of registration with said socket slot, said king pin engaging and shifting said plunger and locking means to release said coupling member upon seating in said socket slot.

4. In combination, a tractor, a semi-trailer, cooperating plates carried by said tractor and trailer, one of said plates carrying a king pin and the other having a king pin receiving slot formed therein, a socket carried by said slotted plate and having a slot registering with said plate slot, a coupling member freely rotatable in said socket and having a radial slot formed therein, a spring pressed plunger carried by said socket and normally projecting into said slot, means carried by said plunger for locking said coupling member with its slot registering with said socket slot, means urging said coupling member to a position with its slot out of registration with said socket slot, said king pin engaging and shifting said plunger and locking means to release said coupling member upon seating in said socket slot, and means for locking said coupling member with its slot out of registration with said socket slot.

5. In combination, a tractor, a semi-trailer, cooperating plates carried by said tractor and trailer, one of said plates carrying a king pin and the other having a king pin receiving slot formed therein, a coupling member rotatably carried by said slotted plate and having a radial slot formed therein, a spring pressed plunger for locking said coupling member with its slot registering with said plate slot, and means urging said coupling member to a position with its slot out of registration with said plate slot, said king pin engaging and shifting said plunger to unlocking position upon seating in said plate slot.

6. In combination, a tractor, a semi-trailer, cooperating plates carried by said tractor and trailer, one of said plates carrying a king pin and the other having a king pin receiving slot formed therein, a coupling member rotatably carried by said slotted plate and having a radial slot formed therein, a spring pressed plunger for locking said coupling member with its slot registering with said plate slot, means urging said coupling member to a position with its slot out of registration with said plate slot, said king pin engaging and shifting said plunger to unlocking position upon seating in said plate slot, and means for locking said coupling with its slot out of registration with said socket slot.

7. A fifth wheel comprising a pair of cooperating bearing members, one of said members carrying a king pin and the other having a king pin receiving slot formed therein, a socket carried by said slotted member and having a king pin receiving slot registering with the slot of said bearing member, a coupling member shiftable in said socket, means for locking said coupling member in king pin receiving position and shiftable to unlocking position by said king pin, means for shifting said coupling member to king pin retaining position, and means for locking said coupling member in king pin retaining position.

8. A fifth wheel construction comprising a pair of bearing members, one of said members carrying a pin and the other having a pin receiving slot formed therein, a socket carried by said slotted bearing member, a coupling member shiftable in said socket and having a notch formed therein, a spring pressed plunger shiftably carried by said socket, and a projection carried by said plunger and normally seated in said notch to hold said coupling member in pin receiving position, said pin engaging and shifting said plunger to withdraw said projection from said notch when seating in said slot.

9. A fifth wheel construction comprising a pair of bearing members, one of said members carrying a pin and the other having a pin receiving slot formed therein, a coupling member shiftably carried by said slotted member and having a notch formed therein, and a plunger having a projection normally seated in said notch to hold said coupling member in pin receiving position, said pin engaging and shifting said plunger to withdraw said projection from said notch when seating in said slot.

JOHN S. EDWARDS.